(12) United States Patent
Cheatham, III et al.

(10) Patent No.: US 9,766,064 B2
(45) Date of Patent: Sep. 19, 2017

(54) AD-HOC WIRELESS SENSOR PACKAGE

(71) Applicant: Elwha LLC, Bellevue, WA (US)

(72) Inventors: Jesse R. Cheatham, III, Seattle, WA (US); Matthew G. Dyor, Bellevue, WA (US); Peter N. Glaskowsky, Carnation, WA (US); Kimberly D. A. Hallman, Bellevue, WA (US); Roderick A. Hyde, Redmond, WA (US); Muriel Y. Ishikawa, Livermore, CA (US); Edward K. Y. Jung, Bellevue, WA (US); Michael F. Koenig, Bellevue, WA (US); Robert W. Lord, Seattle, WA (US); Richard T. Lord, Tacoma, WA (US); Craig J. Mundie, Seattle, WA (US); Nathan P. Myhrvold, Bellevue, WA (US); Robert C. Petroski, Seattle, WA (US); Desney S. Tan, Kirkland, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 647 days.

(21) Appl. No.: 13/727,102

(22) Filed: Dec. 26, 2012

(65) Prior Publication Data

US 2014/0180628 A1 Jun. 26, 2014

(51) Int. Cl.
| | |
|---|---|
| G01B 21/16 | (2006.01) |
| G06F 21/62 | (2013.01) |
| G05B 19/00 | (2006.01) |
| G01B 21/00 | (2006.01) |
| G01B 11/00 | (2006.01) |

(52) U.S. Cl.
CPC .............. G01B 21/00 (2013.01); G01B 11/00 (2013.01)

(58) Field of Classification Search
CPC ........... H02J 7/025; H02J 17/00; G01B 11/00; G01B 21/00; G06F 21/31; H04L 67/00; H04Q 2209/886; H04Q 9/00; H04W 52/0219; H04W 84/18; Y02B 60/50; Y10T 307/25; Y10T 307/344
USPC .............. 702/150, 189, 60, 62; 307/23, 126; 320/108; 340/539.13, 870.03, 447; 370/328; 600/301
See application file for complete search history.

(56) References Cited

U.S. PATENT DOCUMENTS

| | | |
|---|---|---|
| 3,995,429 A | 12/1976 | Peters |
| 6,123,093 A | 9/2000 | D'Antonio et al. |
| (Continued) | | |

OTHER PUBLICATIONS

Cottone, Francesco; "Introduction to Vibration Energy Harvesting"; NiPS Energy Harvesting Summer School, ESIEE Paris; Paris, France; bearing a date of Aug. 2011; pp. 1-48.
(Continued)

*Primary Examiner* — John H Le

(57) ABSTRACT

Systems, methods, computer-readable storage mediums including computer-readable instructions and/or circuitry for communicating with one or more sensors in an ad-hoc sensor network may implement operations including, but not limited to: receiving one or more wireless signals indicative of a presence of a sensor within a portion of a region to be monitored; storing location data associated with the portion of the region to be monitored; and wirelessly transmitting one or more sensor operation activation signals to one or more sensors according to the location data.

30 Claims, 14 Drawing Sheets

(56) References Cited

U.S. PATENT DOCUMENTS

| | | | |
|---|---|---|---|
| 6,166,317 | A | 12/2000 | Volk, Jr. |
| 7,220,015 | B2 | 5/2007 | Dowling |
| 8,099,130 | B1 | 1/2012 | Halla et al. |
| 8,531,288 | B1* | 9/2013 | Khan et al. .............. 340/539.13 |
| 8,638,253 | B1 | 1/2014 | Dryer |
| 8,674,804 | B2 | 3/2014 | Miller et al. |
| 8,947,230 | B1 | 2/2015 | Gettings et al. |
| 2003/0025603 | A1 | 2/2003 | Smith |
| 2004/0090195 | A1 | 5/2004 | Motsenbocker |
| 2005/0143133 | A1 | 6/2005 | Bridgelall |
| 2006/0064196 | A1 | 3/2006 | Inkpen et al. |
| 2006/0191185 | A1 | 8/2006 | Hansen |
| 2006/0238309 | A1 | 10/2006 | Takatama |
| 2007/0040687 | A1 | 2/2007 | Reynolds |
| 2007/0052692 | A1* | 3/2007 | Gruhlke et al. .............. 345/175 |
| 2007/0139183 | A1 | 6/2007 | Kates |
| 2008/0148059 | A1 | 6/2008 | Shapiro |
| 2008/0186173 | A1 | 8/2008 | Gates |
| 2009/0010197 | A1 | 1/2009 | Chao et al. |
| 2009/0030551 | A1 | 1/2009 | Hein et al. |
| 2009/0085718 | A1 | 4/2009 | Hamel et al. |
| 2010/0125437 | A1 | 5/2010 | Vasseur et al. |
| 2010/0161630 | A1 | 6/2010 | Moriwaki et al. |
| 2010/0223659 | A1 | 9/2010 | Ekl et al. |
| 2010/0243633 | A1 | 9/2010 | Huynh et al. |
| 2010/0308990 | A1 | 12/2010 | Simon et al. |
| 2011/0263950 | A1* | 10/2011 | Larson .................. A61B 5/024 600/301 |
| 2012/0065930 | A1* | 3/2012 | Allee et al. ................... 702/150 |
| 2012/0173050 | A1 | 7/2012 | Bernstein et al. |
| 2012/0176239 | A1 | 7/2012 | Preden et al. |
| 2012/0300067 | A1 | 11/2012 | Naqvi |
| 2013/0085688 | A1 | 4/2013 | Miller et al. |
| 2013/0099922 | A1 | 4/2013 | Lohbihler |
| 2013/0307703 | A1 | 11/2013 | Foucher et al. |
| 2014/0077944 | A1 | 3/2014 | Baskin et al. |
| 2014/0145025 | A1* | 5/2014 | Fang et al. ................. 244/17.11 |
| 2014/0347193 | A1 | 11/2014 | Ljung et al. |

OTHER PUBLICATIONS

Sonkusale, Sameer R. et al.; "A Wireless Data and Power Telemetry System Using Novel BPSK Demodulator for Non-Destructive Evaluation of Structures"; IEEE Sensors 2007 Conference; created on Apr. 11, 2017; pp. 300-303.

Young, William F. et al.; "Optimizing Arrays of Randomly Placed Wireless Transmitters for Receivers Located Within the Array Volume"; IEEE Transactions on Antennas and Propagation; Mar. 2007; pp. 698-706; vol. 55, No. 3.

Chevalerias, Olivier et al.; "Inductive Telemetry of Multiple Sensor Modules"; Pervasive Computing; Jan.-Mar. 2005; pp. 46-52; IEEE CS and IEEE ComSoc.

Cotterell, Susan et al.; "Applications and Experiments with eBlocks—Electronic Blocks for Basic Sensor-Based Systems"; IEEE; 2004; created on Apr. 11, 2017; pp. 7-15.

* cited by examiner

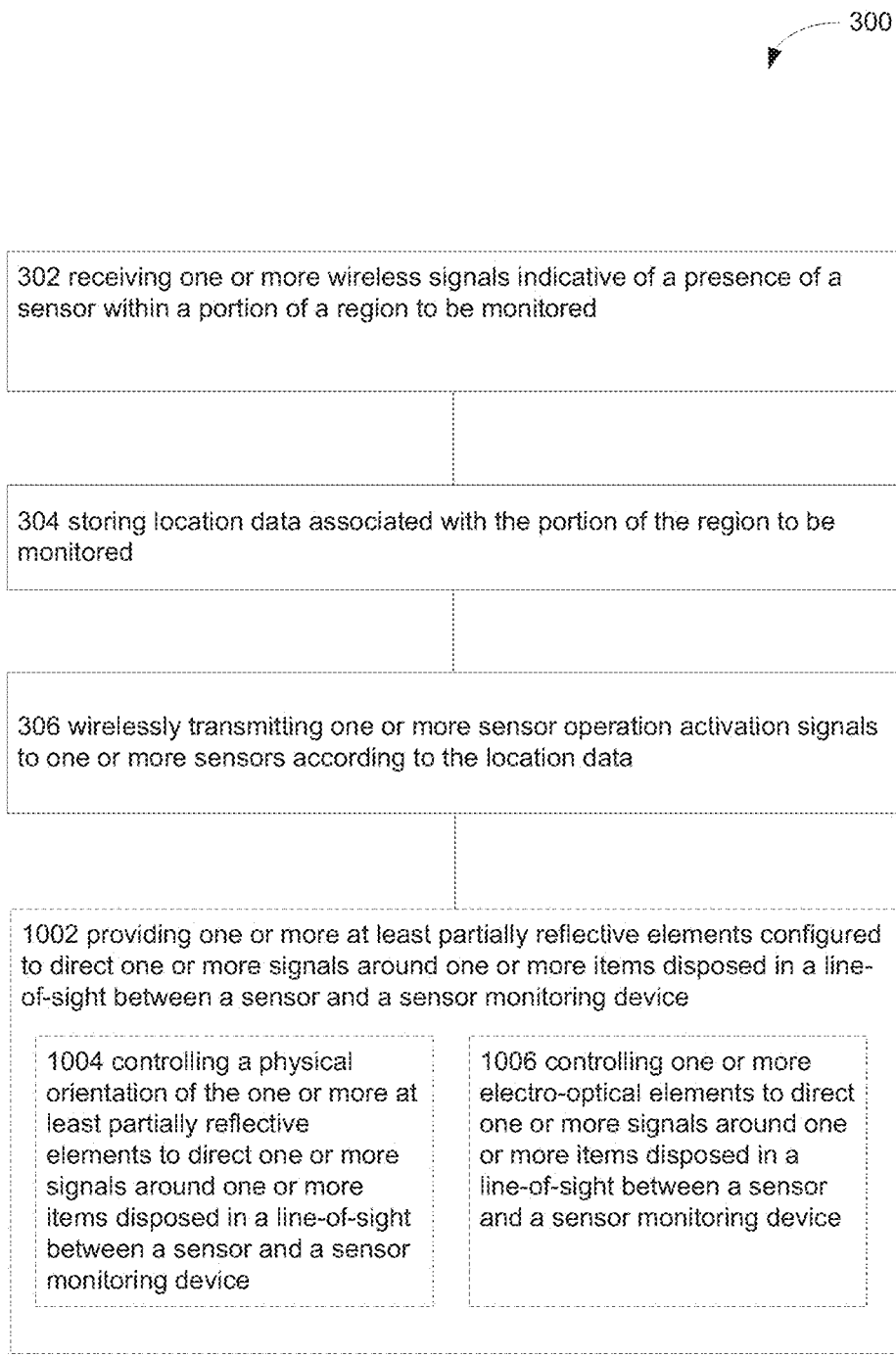

```
┌──────────────────────────────────────────────────────────────────┐
│ 302 receiving one or more wireless signals indicative of a       │
│ presence of a sensor within a portion of a region to be monitored│
└──────────────────────────────────────────────────────────────────┘
                                 │
┌──────────────────────────────────────────────────────────────────┐
│ 304 storing location data associated with the portion of the     │
│ region to be monitored                                           │
└──────────────────────────────────────────────────────────────────┘
                                 │
┌──────────────────────────────────────────────────────────────────┐
│ 306 wirelessly transmitting one or more sensor operation         │
│ activation signals to one or more sensors according to the       │
│ location data                                                    │
└──────────────────────────────────────────────────────────────────┘
                                 │
┌──────────────────────────────────────────────────────────────────┐
│ 1002 providing one or more at least partially reflective         │
│ elements configured to direct one or more signals around one or  │
│ more items disposed in a line-of-sight between a sensor and a    │
│ sensor monitoring device                                         │
│ ┌───────────────────────────────┐ ┌────────────────────────────┐ │
│ │ 1004 controlling a physical   │ │ 1006 controlling one or    │ │
│ │ orientation of the one or     │ │ more electro-optical       │ │
│ │ more at least partially       │ │ elements to direct one or  │ │
│ │ reflective elements to direct │ │ more signals around one or │ │
│ │ one or more signals around    │ │ more items disposed in a   │ │
│ │ one or more items disposed in │ │ line-of-sight between a    │ │
│ │ a line-of-sight between a     │ │ sensor and a sensor        │ │
│ │ sensor and a sensor           │ │ monitoring device          │ │
│ │ monitoring device             │ │                            │ │
│ └───────────────────────────────┘ └────────────────────────────┘ │
└──────────────────────────────────────────────────────────────────┘
```

FIG. 10

AD-HOC WIRELESS SENSOR PACKAGE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/727,109, entitled AD-HOC WIRELESS SENSOR PACKAGE, naming JESSE R. CHEATHAM, III, MATTHEW G. DYOR, PETER N. GLASKOWSKY, KIMBERLY D.A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012 is related to the present application.

U.S. patent application Ser. No. 13/727,117, entitled AD-HOC WIRELESS SENSOR PACKAGE, naming JESSE R. CHEATHAM, III, MATTHEW G. DYOR, PETER N. GLASKOWSKY, KIMBERLY D.A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012 is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

Systems, methods, computer-readable storage mediums including computer-readable instructions and/or circuitry for communicating with one or more sensors in an ad-hoc sensor network may implement operations including, but not limited to: receiving one or more wireless signals indicative of a presence of a sensor within a portion of a region to be monitored; storing location data associated with the portion of the region to be monitored; and wirelessly transmitting one or more sensor operation activation signals to one or more sensors according to the location data.

The foregoing summary is illustrative only and is not intended to be in any way limiting. In addition to the illustrative aspects, embodiments, and features described above, further aspects, embodiments, and features will become apparent by reference

BRIEF DESCRIPTION OF THE FIGURES

FIGS. 3-14 show operations for communicating with one or more sensors in an ad-hoc sensor network.

DETAILED DESCRIPTION

Figure 1:
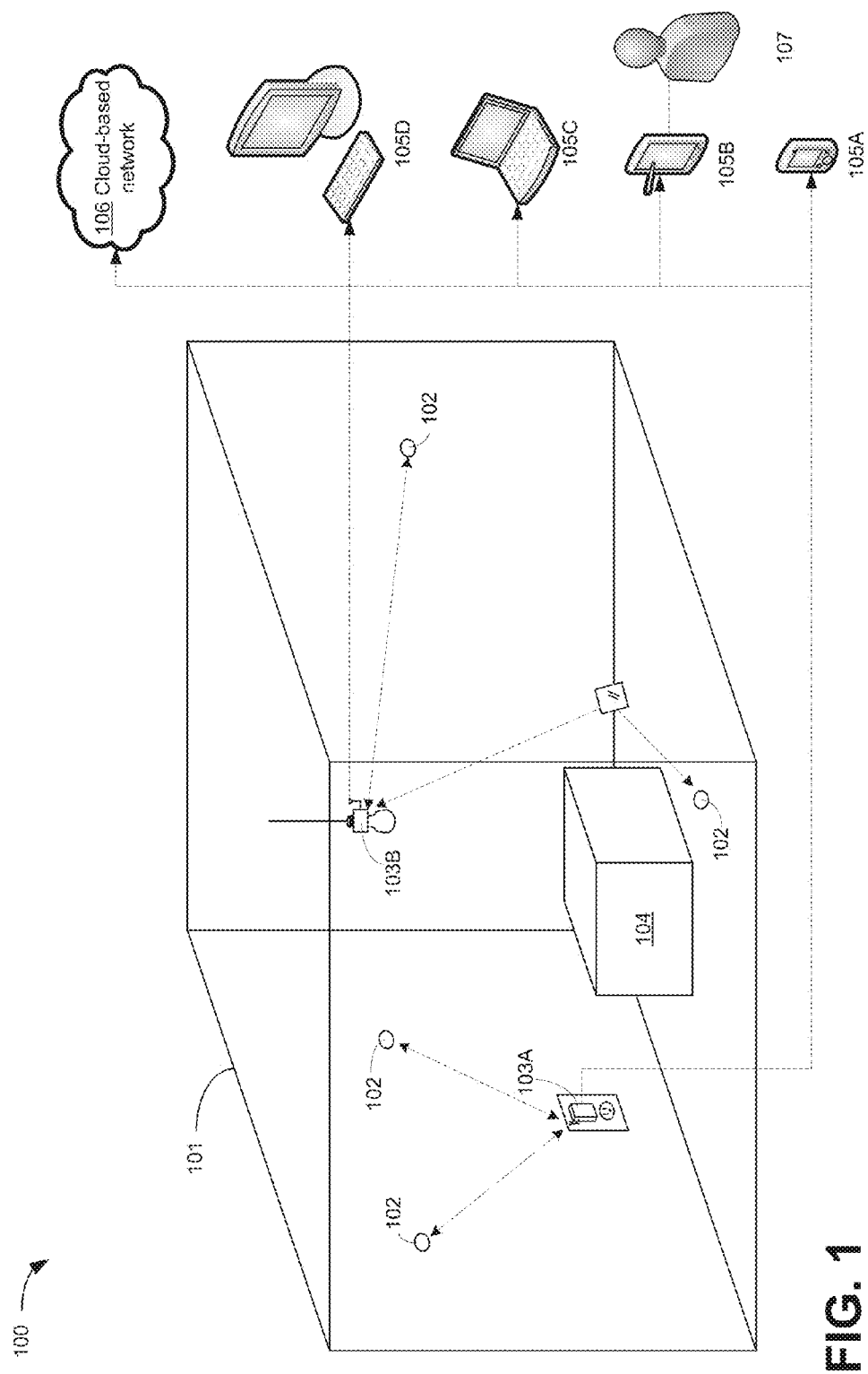
FIG. 1 shows a high-level block diagram of an operational environment communicating with one or more sensors in an ad-hoc sensor network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an ad hoc sensor system 100 disposed about a region 101. The ad hoc sensor system 100 may include one or more sensors 102 and one or more sensor monitoring devices 103. The sensors 102 may be simple single or limited-purpose sensors configured for monitoring one or more characteristics of an environment. For example, the sensors 102 may be thermal sensors, pressure sensors, motion sensors, image capture sensors, audio sensors, electromagnetic sensors, and the like, configured for monitoring of the region 101 and/or one or more items 104 (e.g. machines, people, products, and the like) located within the region 101. The sensors may be affixed to any surface within the region 101 via various means. In one embodiment, the sensors 102 may include an adhesive composition capable of adhering to a surface within the region 101. More specifically, the adhesive composition may be a moisture-activated adhesive such that a user may apply a liquid (e.g. water or saliva) to the adhesive composition thereby activating the adhesive and allowing for disposal of the sensor 102 on a surface.

A sensor monitoring device 103 may serve to provide a communications link between the sensors 102 and one or more processing devices 105 (e.g. a cell phone 105A, a tablet computer 105B, a laptop computer 105C, a desktop computer 105D, and the like and/or a cloud-based network 106 running an application accessible by such devices) which may receive data from the sensors 102 and provide that data to a user 107 monitoring the region 101 and/or the items 104. The sensor monitoring devices 103 may be pluggable (e.g. configured to be received within or to receive) with respect to one or more standard environmental devices (e.g. a standard 110-volt wall outlet-pluggable sensor monitoring device 103A, a standard 60-watt light socket-pluggable sensor monitoring device 103B, and the like) such that the region 101 may be easily retrofitted to employ the ad hoc sensor system 100 by incorporating the sensor monitoring devices 103 into pre-existing power supplies.

Figure 2:
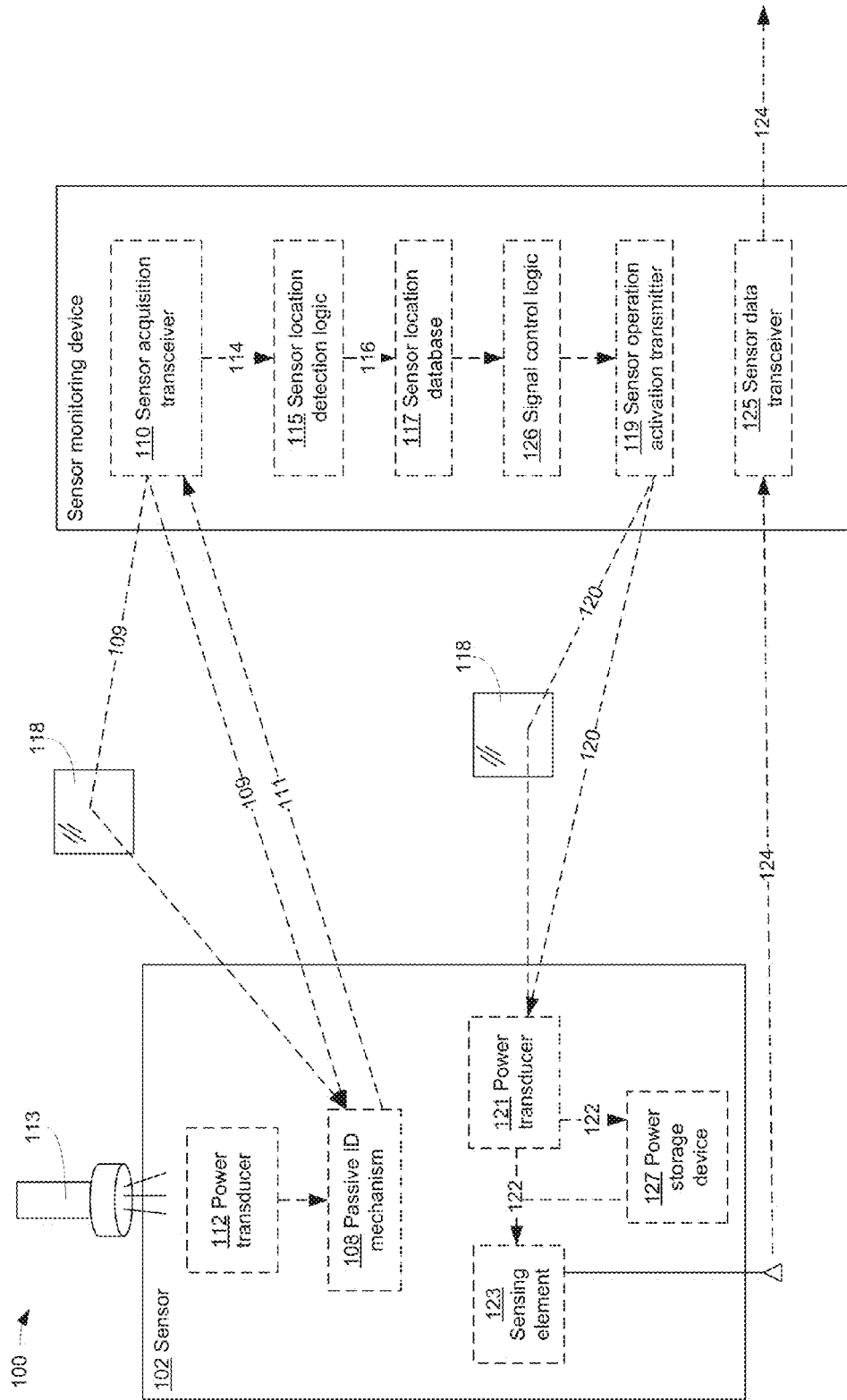
FIG. 2 shows a high-level block diagram of a system for communicating with one or more sensors in an ad-hoc sensor network.

Referring to FIG. 2, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensor 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

The identification signal 111 may simply be a beacon-type signal that simply indicates the presence of a sensor 102 within the currently scanned region (e.g. where the passive identification mechanism 108 is merely a reflective surface on the sensor 102). Alternately the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

In another embodiment, the passive identification mechanism 108 may provide the identification signal 111 independent of any interaction with the sensor monitoring device 103. For example, the sensor 102 may include a transducer 112 responsive to an independent signal source 113 (e.g. a flashlight, handheld UV light, and the like). The transducer 112 may convert a signal (e.g. light) from the independent signal source 113 into power sufficient to power the passive identification mechanism 108 to generate the identification signal 111 for transmission to the sensor monitoring device 103. As such, a user tasked with affixing one or more sensors 102 about the region 101 may, at the same time, temporarily activate the passive identification mechanism 108 via the independent signal source 113 to allow for initial acquisition of the sensor 102 by the sensor monitoring device 103. It may be the case that the sensor monitoring device 103 is continually monitoring the region 101 and may detect the presence of the sensor 102 within the temporary activation of the passive identification mechanism 108 via the independent signal source 113.

The sensor monitoring device 103 may scan the region 101 in a zonal manner whereby the sensor acquisition transceiver 110 is progressively directed to various portions of the region 101 and transmits the sensor acquisition signal 109. Upon detection of a presence of a sensor 102 within a portion of the region 101 currently subject to scanning through receipt of the identification signal 111, the sensor acquisition transceiver 110 may provide a signal 114 to sensor location detection logic 115 of the sensor monitoring device 103. The sensor location detection logic 115 may, in turn, correlate the portion of the region 101 currently subject to scanning (e.g. via data associated with a current orientation of one or more control actuators and/or a directional antenna associated with the sensor acquisition transceiver 110) with a detected sensor 102 and store sensor location data 116 associated with that portion of the region 101 to a sensor location database 117. In one embodiment, the sensor acquisition transceiver 110 may scan along a first axis (e.g. an x-axis) and then scan along a second axis (e.g. a y-axis).

Further, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

The sensors 102 may be configured as passive sensors with no on-board power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations. Following sensing operations by the sensing element 123, sensor data 124 may be transmitted to a sensor data transceiver 125 of the sensor monitoring device 103 which, in turn, may transmit the sensor data 124 on to the processing devices 105 for further data analysis and review by a user.

In an exemplary embodiment, signal control logic 126 of the sensor monitoring devices 103 may obtain sensor location data 116 from previous sensor acquisitions. The signal control logic 126 may query the sensor location database 117 for the location of at least one sensor 102 and provide control signals to the sensor acquisition transceiver 110 to direct the sensor operation activation signal 120 in the direction of the at least one sensor 102 (e.g. via configuring one or more actuators or a directional antennal array). The signal control logic 126 may cycle through the detected inventory of sensors 102 and configure the sensor operation activation transmitter 119 to transmit the sensor operation activation signal 120 in the direction of a given sensor 102 during a given time interval associated with that sensor 102 before moving on to transmissions to additional sensors 102. It may be the case that the sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to cache sensor data over a period of days or weeks. As such, a sensor 102 may include a power storage device 127 (e.g. a capacitor, a battery, and the like) chargeable by the power 122 generated by the power transducer 121 in response to the sensor operation activation signal 120. The power stored by the power storage device 127 may be surplus power provided during irradiation of the power transducer 121 by the sensor operation activation transmitter 119 that is not required for sensing operations of the sensing element 123 during that time period. The power stored by the power storage device 127 may then be used for sensing operations of the sensing element 123 during time periods where the sensor operation activation transmitter 119 is not currently irradiating the power transducer 121.

In another exemplary embodiment, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

In another exemplary embodiment, a sensing element 123 may include at least one passive (e.g. operating only in response to an environmental stimulus) sensing element. For example, the sensing element 123 may include a MEMS device which may be responsive to environmental conditions such as temperature, pressure, humidity, and the like. Upon irradiation of the sensor 102 by a sensor operation activation signal 120 wirelessly transmitted by the sensor operation activation transmitter 119 (e.g. optical/laser transceiver, and the like) of the sensor monitoring device 103, may receive the sensor operation activation signal 120, modulate that sensor operation activation signal 120 according to the environmental conditions and retransmit the modulated sensor operation activation signal 120 as the sensor data 124.

Figure 3:
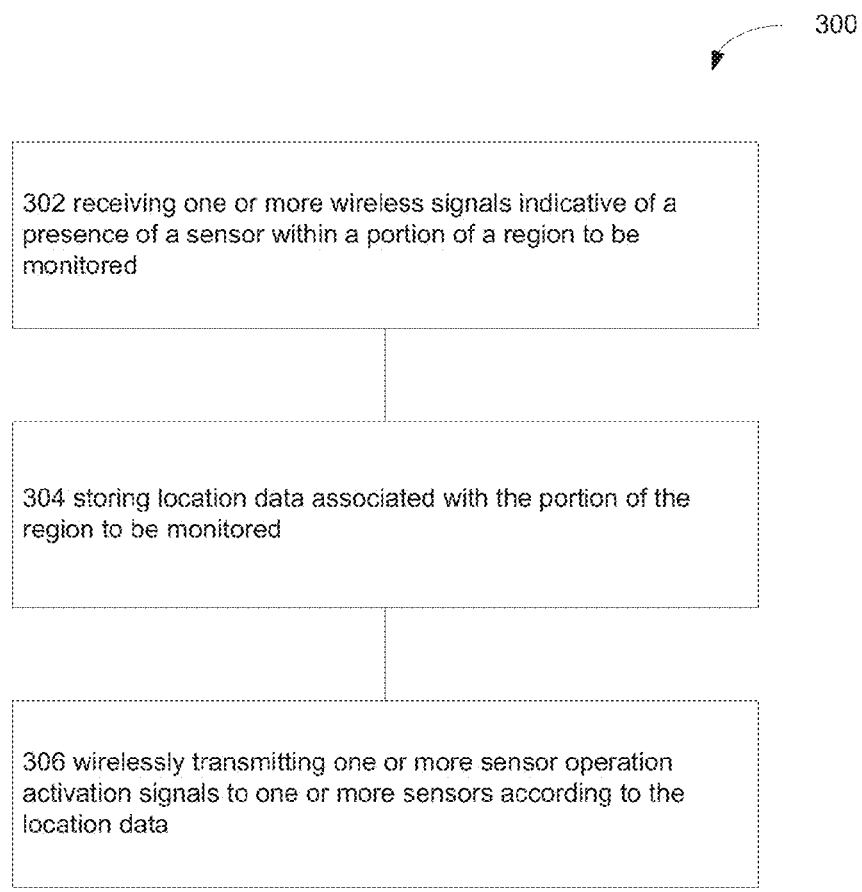

FIG. 3 and the following figures include various examples of operational flows, discussions and explanations may be provided with respect to the above-described exemplary environment of FIGS. 1-2. However, it should be understood that the operational flows may be executed in a number of other environments and contexts, and/or in modified versions of FIGS. 1-2. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 3 illustrates an operational procedure 300 for practicing aspects of the present disclosure including operations 302, 304 and 306.

Operation 302 illustrates receiving one or more wireless signals indicative of a presence of a sensor within a portion of a region to be monitored. For example, as shown in FIGS. 1-2, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensors 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may, in turn, wirelessly transmit an identification signal 111 indicative of the presence of the sensor 102 within the region 101 which may be received by the sensor acquisition transceiver 110 of the sensor monitoring device 103.

The received identification signal 111 may simply be a beacon-type signal that simply indicates the presence of a sensor 102 within the currently scanned region (e.g. where the passive identification mechanism 108 is merely a reflective surface on the sensor 102). Alternately the received identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Operation 304 illustrates storing location data associated with the portion of the region to be monitored. For example, as shown in FIGS. 1-2, upon receipt of an identification signal 111 indicative of a presence of a sensor 102 within a portion of the region 101 currently subject to scanning, the sensor acquisition transceiver 110 may provide a signal 114 to sensor location detection logic 128 of the sensor monitoring device 103. The sensor location detection logic 115 may, in turn, correlate the portion of the region 101 currently subject to scanning (e.g. via data associated with a current orientation of one or more control actuators and/or a directional antenna associated with the sensor acquisition transceiver 110) with a detected sensor 102 and store sensor location data 116 associated with that portion of the region 101 to a sensor location database 117 (e.g. in a look-up table).

Operation 306 illustrates wirelessly transmitting one or more sensor operation activation signals to one or more sensors according to the location data. For example, as shown in FIGS. 1-2, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The signal control logic 126 may query the sensor location database 117 for the location of at least one sensor 102 and provide control signals to the sensor acquisition transceiver 110 to direct the sensor operation activation signal 120 in the direction of the at least one sensor 102 (e.g. via configuring one or more actuators or a directional antennal array).

Figure 4:
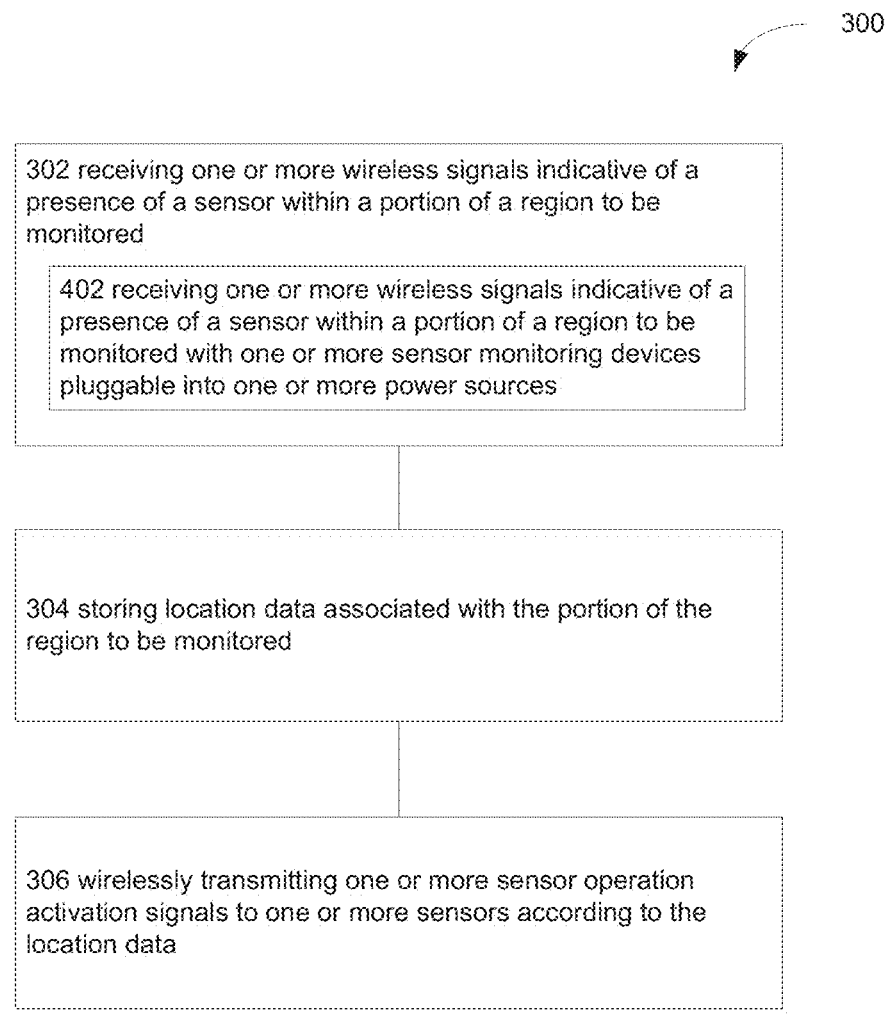

FIG. 4 illustrates an operational procedure wherein operation 302 of operational flow 300 of FIG. 3 may include one or more additional operations. Additional operations may include operation 402.

Operation 402 illustrates receiving one or more wireless signals indicative of a presence of a sensor within a portion of a region to be monitored with one or more sensor monitoring devices pluggable into one or more power sources. For example, as shown in FIG. 1, the sensor monitoring devices 103 may be configured as one or more standard environmental devices (e.g. a wall outlet-pluggable sensor monitoring device 103A, a light socket-pluggable sensor monitoring device 103B, and the like) such that the region 101 may be easily retrofitted to employ the ad hoc sensor system 100 by incorporating the sensor monitoring devices 103 into pre-existing power supplies.

Figure 5:
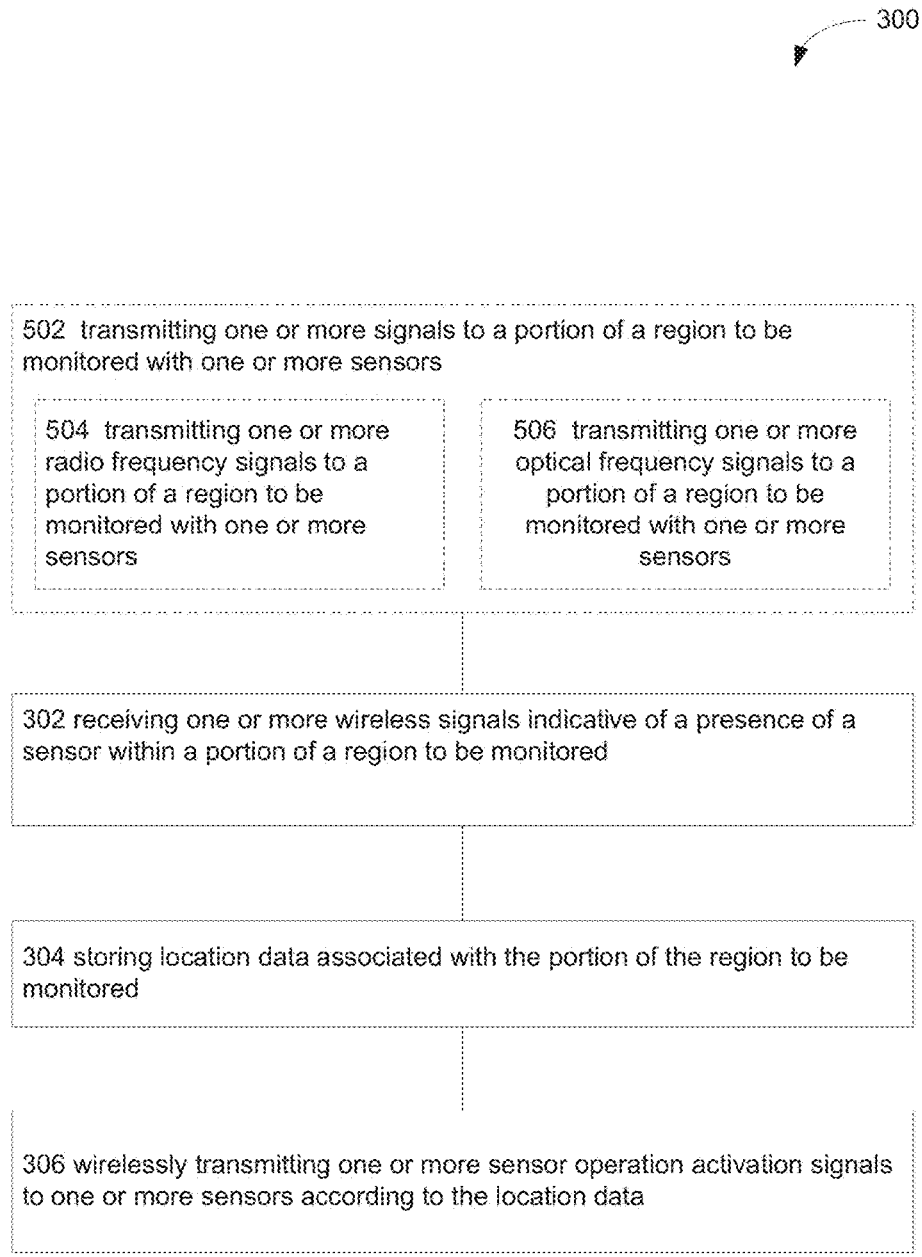

FIG. 5 illustrates an operational procedure wherein operational flow 300 of FIG. 3 may include one or more additional operations. Additional operations may include operation 502.

Operation 502 illustrates transmitting one or more signals to a portion of a region to be monitored with one or more sensors. For example, as shown in FIGS. 1-2, the sensor monitoring device 103 may scan the region 101 in a zonal manner whereby the sensor acquisition transceiver 110 (e.g. a radio transceiver, a microwave transceiver, an infrared transceiver, an optical/laser transceiver, and the like) is progressively directed to various portions of the region 101 and transmits the sensor acquisition signal 109. The sensor monitoring devices 103 may cycle through a defined set of portions of the region 101 maintained by the sensor location database 117 and transmit the sensor operation activation signal 120 to a given portion of the region 101 during a given time interval associated with that portion of the region 101 before moving on to transmissions to additional portions of the region 101.

FIG. 5 further illustrates an operational procedure wherein operation 502 of operational flow 300 of FIG. 5 may include one or more additional operations. Additional operations may include operations 504 and/or 506.

Operation 504 illustrates transmitting one or more radio frequency signals to a portion of a region to be monitored with one or more sensors. For example, as shown in FIGS. 1-2, the sensor acquisition transceiver 110 may be progressively directed to various portions of the region 101 and transmits a sensor acquisition signal 109 characterized by having a frequency in the radio frequency range of from about 3 kHz to 3000 GHz.

Operation 506 illustrates transmitting one or more optical frequency signals to a portion of a region to be monitored with one or more sensors. For example, as shown in FIGS. 1-2, the sensor acquisition transceiver 110 may be progressively directed to various portions of the region 101 and transmits a sensor acquisition signal 109 characterized by having a frequency in the optical/visible frequency range of from about 400-790 THz. Use of a sensor acquisition signal 109 in the optical/visible frequency range may have the advantage that such use is largely unregulated by governmental entities.

Figure 6:
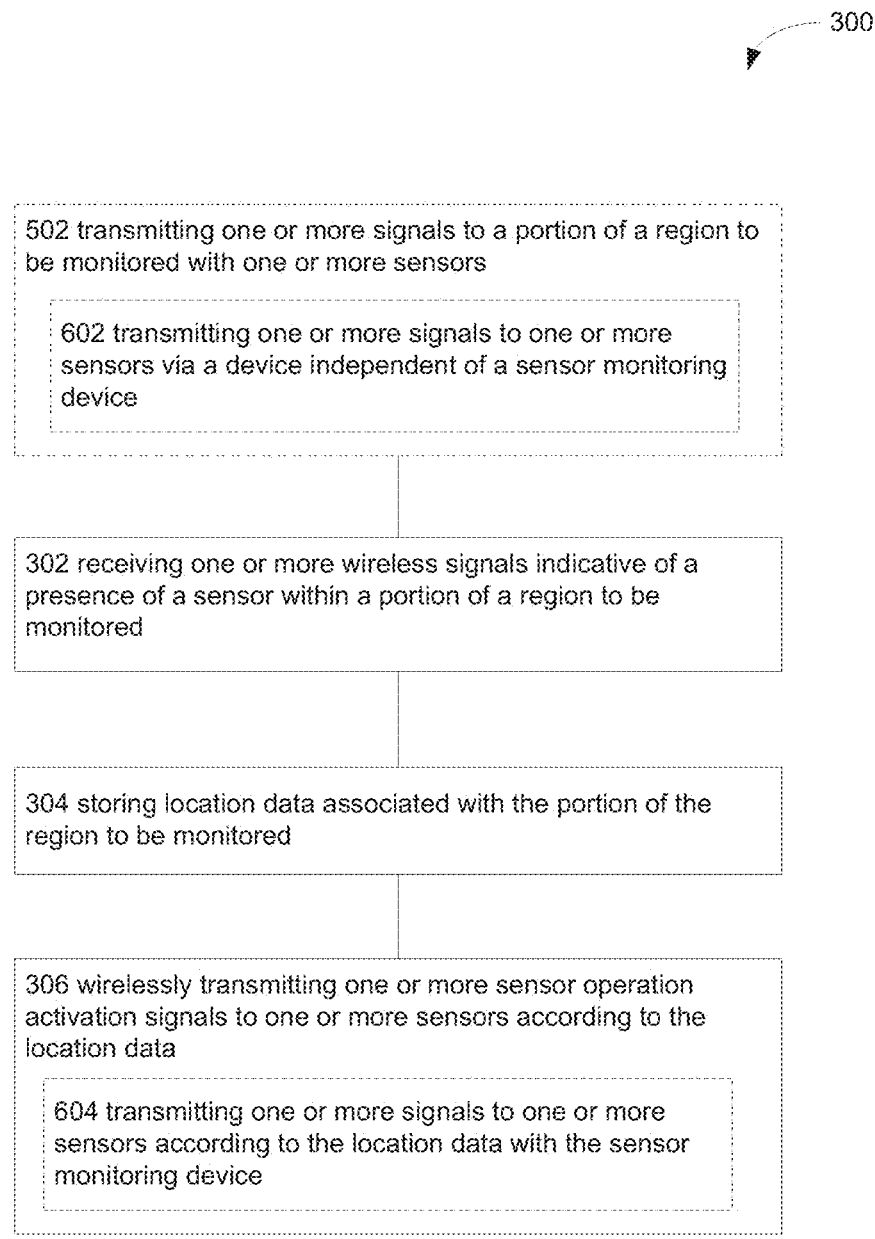

FIG. 6 illustrates an operational procedure wherein operations 502 and 306 of operational flow 300 of FIG. 5 may include one or more additional operations. Additional operations may include operations 602 and 604, respectively.

Operation 602 illustrates transmitting one or more signals to one or more sensors via a device independent of a sensor monitoring device. For example, as shown in FIGS. 1-2, the passive identification mechanism 108 may provide the identification signal 111 independent of any interaction with the sensor monitoring device 103. For example, the sensor 102 may include a transducer 112 responsive to an independent signal source 113 (e.g. a flashlight, handheld UV light, and the like). The transducer 112 may convert a signal (e.g. light) from the independent signal source 113 into power sufficient to power the passive identification mechanism 108 to temporarily generate the identification signal 111 for transmission to the sensor monitoring device 103. As such, a user tasked with affixing one or more sensors 102 about the region 101 may, at the same time, temporarily activate the passive identification mechanism 108 via the independent signal source 113 to allow for initial acquisition of the sensor 102 by the sensor monitoring device 103. It may be the case that the sensor monitoring device 103 is continually monitoring the region 101 and may detect the presence of the sensor 102 within the temporary activation of the passive identification mechanism 108 via the independent signal source 113.

Operation 604 illustrates transmitting one or more signals to one or more sensors according to the location data with the sensor monitoring device. For example, as shown in FIGS. 1-2, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

Figure 7:
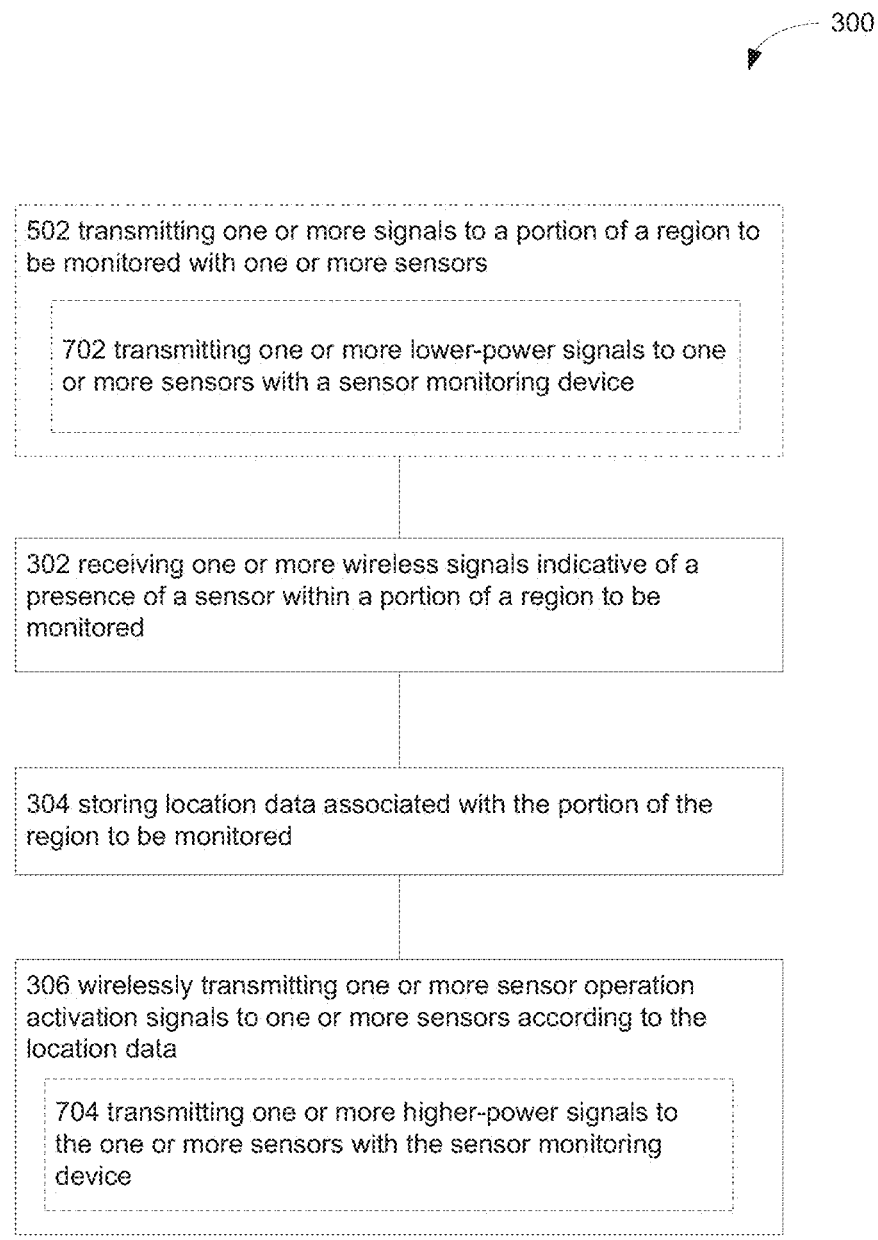

FIG. 7 illustrates an operational procedure wherein operations 502 and 306 of operational flow 300 of FIG. 5 may include one or more additional operations. Additional operations may include operations 702 and 704, respectively.

Operation 702 illustrates transmitting one or more lower-power signals to one or more sensors with a sensor monitoring device. For example, as shown in FIGS. 1-2, the sensor monitoring device 103 may scan the region 101 in a zonal manner whereby a lower-power sensor acquisition transceiver 110 (e.g. a radio transceiver, a microwave transceiver, an infrared transceiver, an optical/laser transceiver, and the like) is progressively directed to various portions of the region 101 and transmits the sensor acquisition signal 109. The sensor monitoring devices 103 may cycle through a defined set of portions of the region 101 maintained by the sensor location database 117 and transmit the sensor operation activation signal 120 to a given portion of the region 101 during a given time interval associated with that portion of the region 101 before moving on to transmissions to additional portions of the region 101.

Operation 704 illustrates transmitting one or more higher-power signals to the one or more sensors with the sensor monitoring device. For example, as shown in FIGS. 1-2, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

Figure 8:
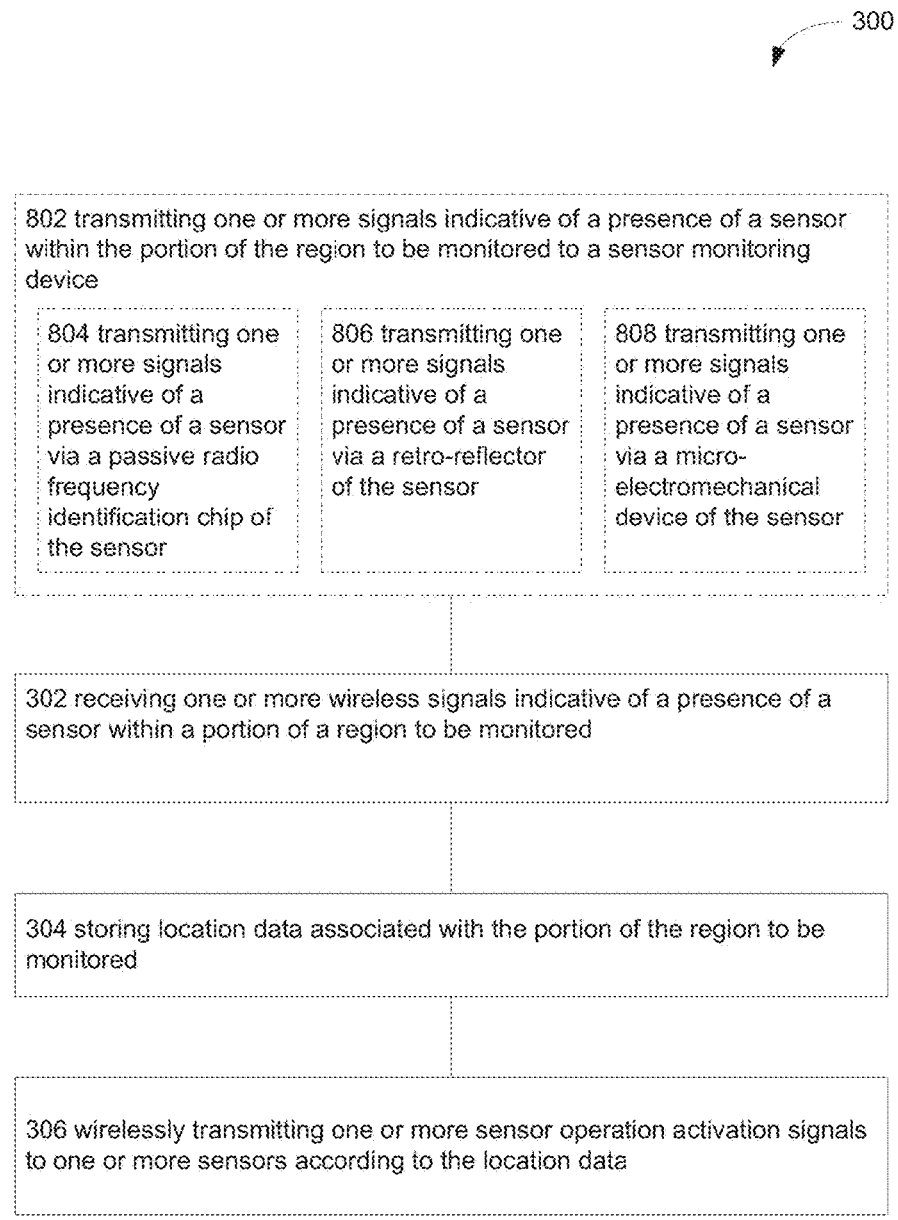

FIG. 8 illustrates an operational procedure wherein operational flow 300 of FIG. 3 may include one or more additional operations. Additional operations may include operation 802.

Operation 802 illustrates transmitting one or more signals indicative of a presence of a sensor within the portion of the region to be monitored to a sensor monitoring device. For example, as shown in FIGS. 1-2, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

FIG. 8 further illustrates an operational procedure wherein operation 802 of operational flow 300 of FIG. 8 may include one or more additional operations. Additional operations may include operations 804, 806 and/or 808.

Operation 804 illustrates transmitting one or more signals indicative of a presence of a sensor via a passive radio frequency identification chip of the sensor. For example, as shown in FIGS. 1-2, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Operation 806 illustrates transmitting one or more signals indicative of a presence of a sensor via a retro-reflector of the sensor. For example, as shown in FIGS. 1-2, the identification signal 111 may simply be a beacon-type signal that indicates the presence of a sensor 102 within the currently scanned region. Specifically, it may be the case that the passive identification mechanism 108 is merely a reflective surface on a retro-reflector that merely reflects the sensor acquisition signal 109 back to the sensor acquisition transceiver 110 as the identification signal 111.

Operation 808 illustrates transmitting one or more signals indicative of a presence of a sensor via a micro-electromechanical device of the sensor. For example, as shown in FIGS. 1-2, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

Figure 9:
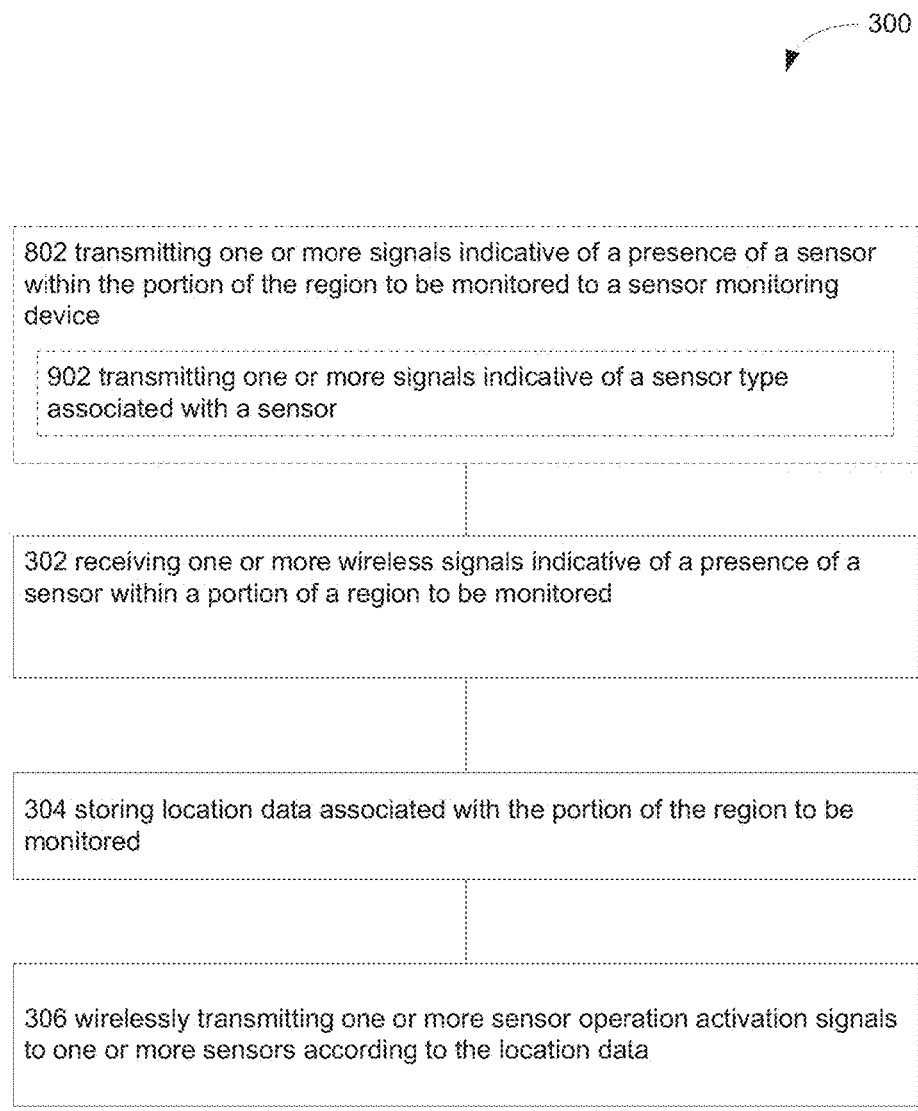

FIG. 9 illustrates an operational procedure wherein operation 802 of operational flow 300 of FIG. 8 may include one or more additional operations. Additional operations may include operation 902.

Operation 902 illustrates transmitting one or more signals indicative of a sensor type associated with a sensor. For example, as shown in FIGS. 1-2, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

FIG. 10 illustrates an operational procedure wherein operational flow 300 of FIG. 3 may include one or more additional operations. Additional operations may include operation 1002.

Operation 1002 illustrates providing one or more at least partially reflective elements configured to direct one or more signals around one or more items disposed in a line-of-sight between a sensor and a sensor monitoring device. For example, as shown in FIGS. 1-2, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

FIG. 10 further illustrates an operational procedure wherein operation 1002 of operational flow 300 of FIG. 10 may include one or more additional operations. Additional operations may include operations 1004 and/or 1006.

Operation 1004 illustrates controlling a physical orientation of the one or more at least partially reflective elements to direct one or more signals around one or more items disposed in a line-of-sight between a sensor and a sensor monitoring device. For example, as shown in FIGS. 1-2, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be controllable structures (e.g. MEMS structures) which may include adjustable reflective surface 118 which may be physically oriented to redirect signals between the a sensor monitoring device 103 and a sensor 102.

Operation 1006 illustrates controlling one or more electro-optical elements to direct one or more signals around one or more items disposed in a line-of-sight between a sensor and a sensor monitoring device. For example, as shown in FIGS. 1-2, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be electrically controllable structures (e.g. a variable electro-optical mirror) which may include adjustable reflective surface 118 which may be physically oriented to redirect signals between the a sensor monitoring device 103 and a sensor 102.

Figure 11:
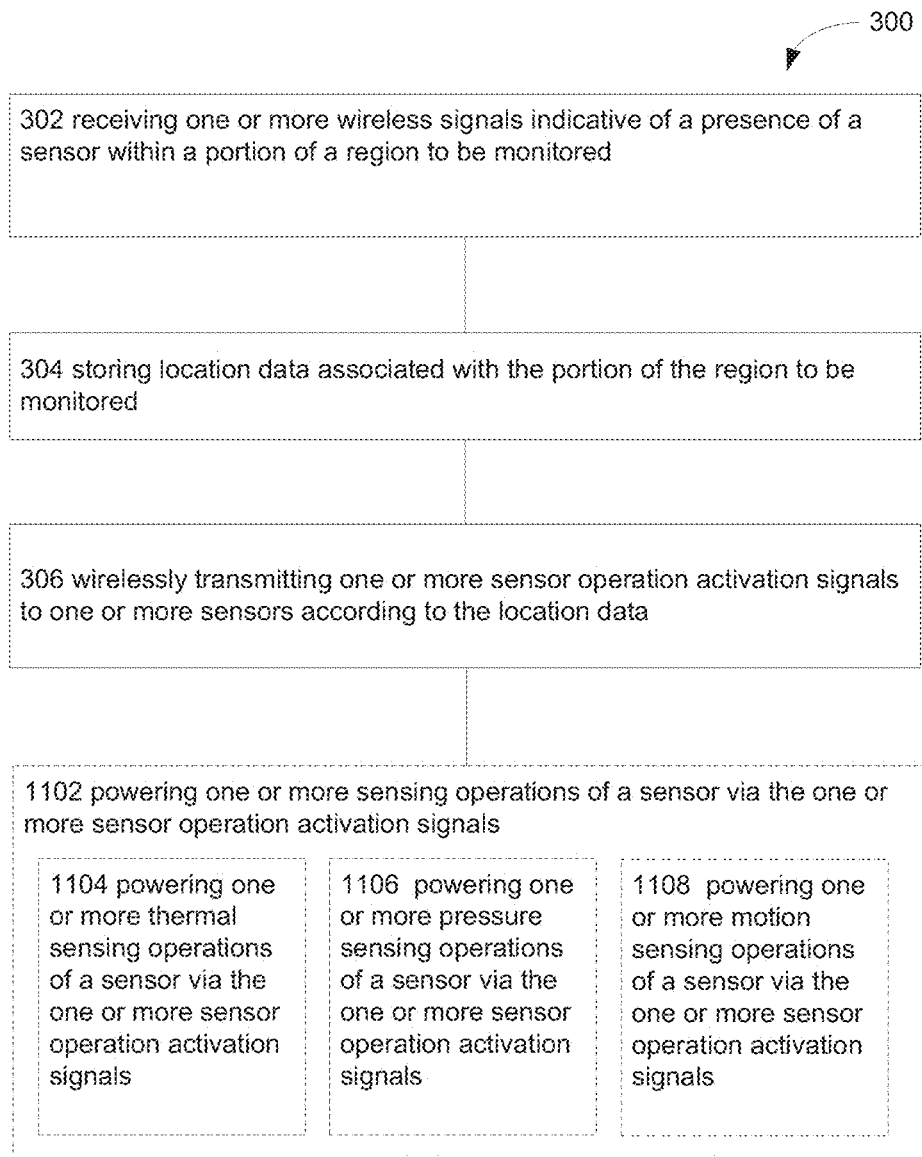

FIG. 11 illustrates an operational procedure wherein operational flow 300 of FIG. 3 may include one or more additional operations. Additional operations may include operation 1102.

Operation 1102 illustrates powering one or more sensing operations of a sensor via the one or more sensor operation activation signals. For example, as shown in FIGS. 1-2, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

FIG. 11 further illustrates an operational procedure wherein operation 1102 of operational flow 300 of FIG. 16 may include one or more additional operations. Additional operations may include operations 1104, 1106 and/or 1108.

Operation 1104 illustrates powering one or more thermal sensing operations of a sensor via the one or more sensor operation activation signals. For example, as shown in FIGS. 1-2, the sensors 102 may be configured as passive sensors with no independent power source for conducting thermal sensing operations by an thermal sensing element 123 (e.g. a thermo-resistor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired thermal sensing operations.

Operation 1106 illustrates powering one or more pressure sensing operations of a sensor via the one or more sensor operation activation signals. For example, as shown in FIGS. 1-2, the sensors 102 may be configured as passive sensors with no independent power source for conducting pressure sensing operations by an pressure sensing element 123 (e.g. a piezoelectric pressure sensor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired pressure sensing operations.

Operation 1108 illustrates powering one or more motion sensing operations of a sensor via the one or more sensor operation activation signals. For example, as shown in FIGS. 1-2, the sensors 102 may be configured as passive sensors with no independent power source for conducting motion sensing operations by a motion sensing element 123 (e.g. a camera, thermal sensor, pressure sensor, radar sensor, and the like). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired motion sensing operations.

Figure 12:
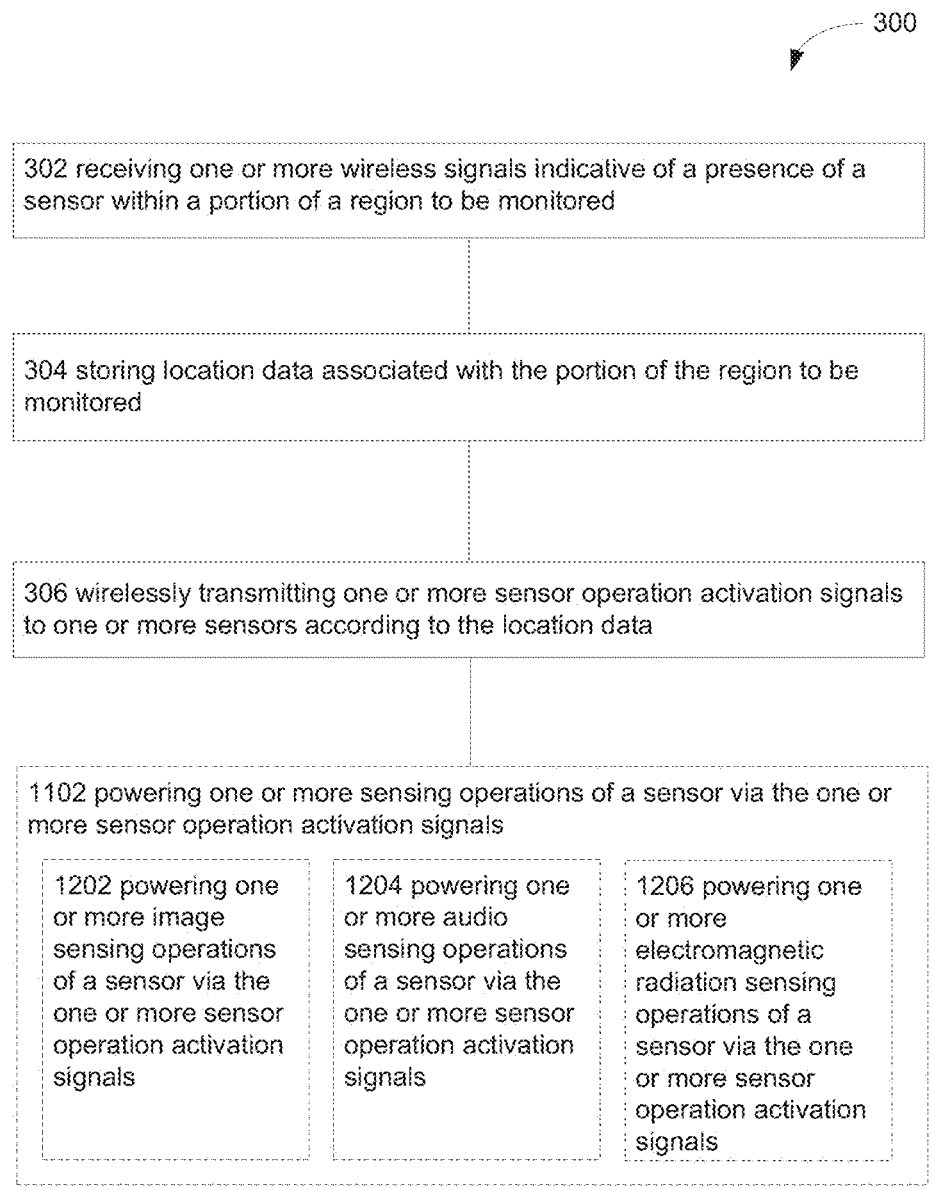

FIG. 12 illustrates an operational procedure wherein operation 1102 of operational flow 300 of FIG. 11 may include one or more additional operations. Additional operations may include operations 1202, 1204 and/or 1206.

Operation 1202 illustrates powering one or more image sensing operations of a sensor via the one or more sensor operation activation signals. For example, as shown in FIGS. 1-2, the sensors 102 may be configured as passive sensors with no on-board power source for conducting image sensing operations by an image capture sensing element 123 (e.g. a still or video camera). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired image sensing operations.

Operation 1204 illustrates powering one or more audio sensing operations of a sensor via the one or more sensor operation activation signals. For example, as shown in FIGS. 1-2, the sensors 102 may be configured as passive sensors with no on-board power source for conducting audio sensing operations by an audio sensing element 123 (e.g. a microphone). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired audio sensing operations.

Operation 1206 illustrates powering one or more electromagnetic radiation sensing operations of a sensor via the one or more sensor operation activation signals. For example, as shown in FIGS. 1-2, the sensors 102 may be configured as passive sensors with no on-board power source for conducting electromagnetic radiation (EMR) sensing operations by an EMR sensing element 123. As such, the sensor monitoring device 103 may include a sensor operation activation transmitter 119 having a relatively higher power configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired EMR sensing operations.

Figure 13:
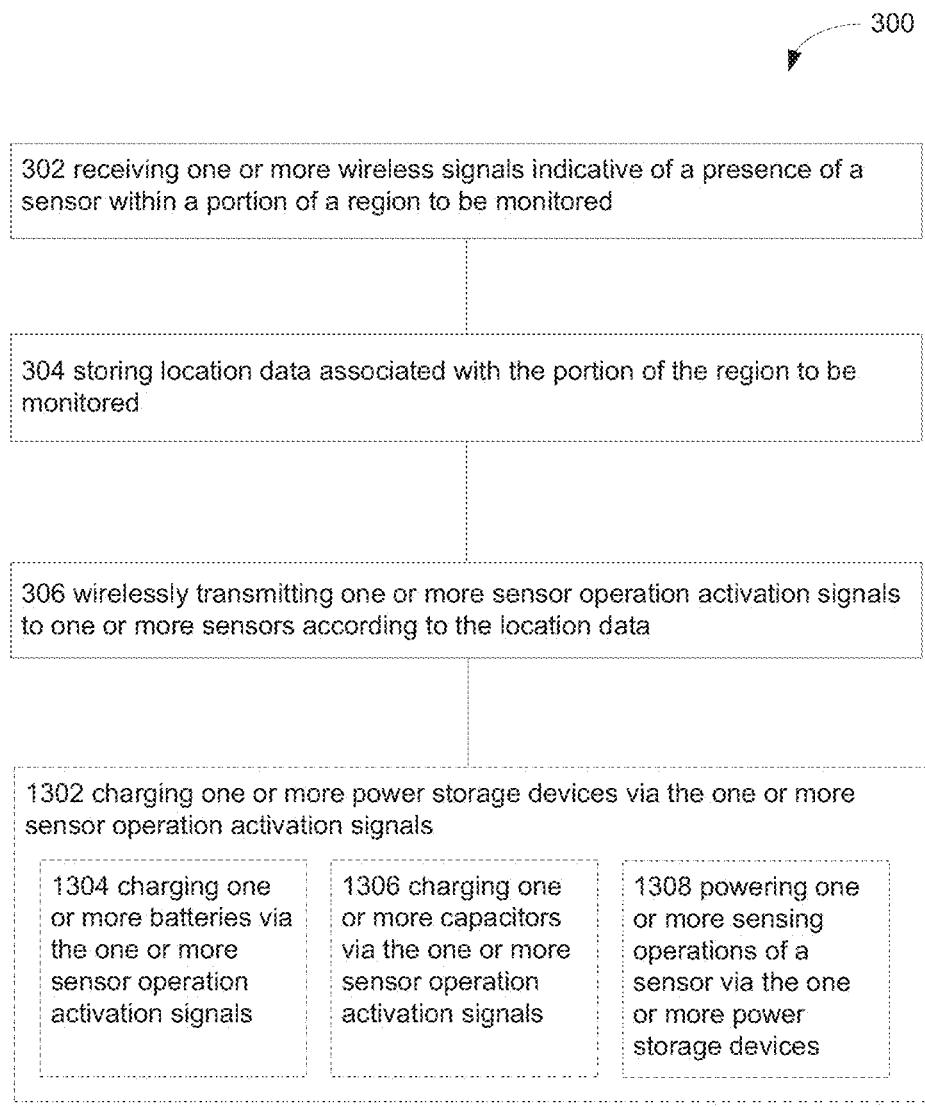

FIG. 13 illustrates an operational procedure wherein operational flow 300 of FIG. 3 may include one or more additional operations. Additional operations may include operation 1302.

Operation 1302 illustrates charging one or more power storage devices via the one or more sensor operation activation signals. For example, as shown in FIGS. 1-2, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include a power storage device 127 (e.g. a capacitor, a battery, and the like) chargeable by the power 122 generated by the power transducer 121 in response to the sensor operation activation signal 120.

FIG. 13 further illustrates an operational procedure wherein operation 1302 of operational flow 300 of FIG. 13 may include one or more additional operations. Additional operations may include operations 1304, 1306 and/or 1308.

Operation 1304 illustrates charging one or more batteries via the one or more sensor operation activation signals. For example, as shown in FIGS. 1-2, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more batteries chargeable by the power 122 generated by the power transducer 121 in response to the sensor operation activation signal 120.

Operation 1306 illustrates charging one or more capacitors via the one or more sensor operation activation signals. For example, as shown in FIGS. 1-2, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more capacitors chargeable by the power 122 generated by the power transducer 121 in response to the sensor operation activation signal 120.

Operation 1308 illustrates powering one or more sensing operations of a sensor via the one or more power storage devices. The power stored by the power storage device 127 may then be used for sensing operations of the sensing element 123 during time periods where the sensor operation activation transmitter 119 is not currently irradiating the power transducer 121.

Figure 14:
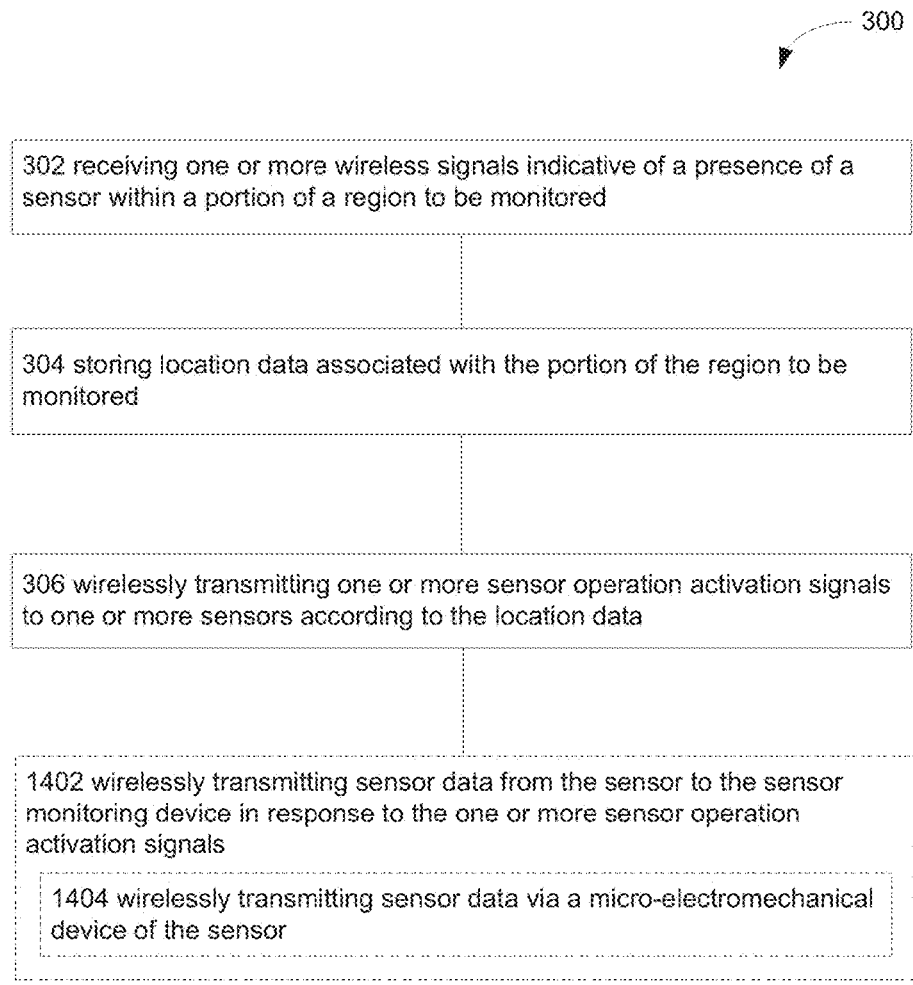

FIG. 14 illustrates an operational procedure wherein operational flow 300 of FIG. 3 may include one or more additional operations. Additional operations may include operation 1402.

Operation 1402 illustrates wirelessly transmitting sensor data from the sensor to the sensor monitoring device in response to the one or more sensor operation activation signals. For example, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

FIG. 14 further illustrates an operational procedure wherein operation 1402 of operational flow 300 of FIG. 21 may include one or more additional operations. Additional operations may include operations 1404.

Operation 1404 illustrates wirelessly transmitting sensor data via a micro-electromechanical device of the sensor. For example, the sensor 102 may not employ the power storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be an optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
    at least one computing device; and
    one or more non-transitory computer readable media bearing one or more instructions that, when executed in the at least one computing device, program the at least one computing device to perform operations including at least:
        receiving, from a sensor, one or more wireless signals indicative of a presence of the sensor within a portion of a region to be monitored;
        determining, based at least partially on the one or more wireless signals received from the sensor, a direction to the sensor relative to a device configured for transmitting one or more sensor operation activation signals;
        determining, based at least partially on the one or more wireless signals received from the sensor, whether a line-of-sight path between the sensor and the device is interrupted;
        detecting one or more relay devices disposed between the sensor and the device based at least partially on the determination whether the line-of-sight path exists; and
        configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices.

2. The system of claim 1, wherein the receiving, from a sensor, one or more wireless signals indicative of a presence of the sensor within a portion of a region to be monitored includes:
    receiving, from a sensor, one or more wireless signals indicative of a presence of the sensor within a portion of a region to be monitored with one or more sensor monitoring devices pluggable into one or more power sources.

3. The system of claim 1, further comprising:
    transmitting one or more signals to a portion of a region to be monitored with one or more sensors.

4. The system of claim 3, wherein the transmitting one or more signals to a portion of a region to be monitored with one or more sensors includes:
    transmitting one or more radio frequency signals to a portion of a region to be monitored with one or more sensors.

5. The system of claim 3, wherein the transmitting one or more signals to a portion of a region to be monitored with one or more sensors includes:
    transmitting one or more optical frequency signals to a portion of a region to be monitored with one or more sensors.

6. The system of claim 3, wherein the transmitting one or more signals to a portion of a region to be monitored with one or more sensors includes:
    transmitting, using a device independent of the sensor operation activation signal transmitter device, one or more signals to a portion of a region to be monitored by one or more sensors.

7. The system of claim 3, wherein the transmitting one or more signals to a portion of a region to be monitored with one or more sensors includes:
    transmitting, using the sensor operation activation signal transmitter device, one or more lower-power signals to one or more sensors;
    and wherein the configuring a directional antenna of the device for directionally transmitting the one or more sensor operation activation signals to the sensor according to the direction to the sensor relative to the device includes:
        transmitting, using the sensor monitoring device, one or more higher-power signals to the one or more sensors with the sensor monitoring device.

8. The system of claim 1, wherein the receiving from a sensor one or more wireless signals indicative of a presence of the sensor within a portion of a region to be monitored includes:
    receiving one or more signals indicative of a presence of a sensor and transmitted via a passive radio frequency identification chip of the sensor.

9. The system of claim 1, wherein the receiving, from a sensor, one or more wireless signals indicative of a presence of the sensor within a portion of a region to be monitored includes:
    receiving one or more signals indicative of a presence of a sensor and transmitted via a retro-reflector of the sensor.

10. The system of claim 1, wherein the receiving, from a sensor, one or more wireless signals indicative of a presence of the sensor within a portion of a region to be monitored includes:
    receiving one or more signals indicative of a presence of a sensor and transmitted via a micro-electromechanical device of the sensor.

11. The system of claim 1, wherein the receiving, from a sensor, one or more wireless signals indicative of a presence of the sensor within a portion of a region to be monitored includes:
   receiving one or more signals indicative of a sensor type associated with a sensor.

12. The system of claim 1, wherein the detecting one or more relay devices disposed between the sensor and the device based at least partially on the determination whether the line-of-sight path exists comprises:
   detecting one or more at least partially reflective elements configured to direct one or more signals around one or more items disposed in a line-of-sight between a sensor and a sensor monitoring device.

13. The system of claim 12, wherein the detecting one or more at least partially reflective elements configured to direct one or more signals around one or more items disposed in a line-of-sight between a sensor and a sensor monitoring device includes:
   controlling a physical orientation of the one or more at least partially reflective elements to direct one or more signals around one or more items disposed in a line-of-sight between a sensor and a sensor monitoring device.

14. The system of claim 12, wherein the detecting one or more at least partially reflective elements configured to direct one or more signals around one or more items disposed in a line-of-sight between a sensor and a sensor monitoring device includes:
   controlling one or more electro-optical elements to direct one or more signals around one or more items disposed in a line-of-sight between a sensor and a sensor monitoring device.

15. The system of claim 12, wherein the configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices comprises:
   configuring the directional antenna of the device to direct a signal to the detected one or more at least partially reflective elements.

16. The system of claim 1, further comprising:
   powering one or more sensing operations of a sensor via the one or more sensor operation activation signals.

17. The system of claim 16, wherein the powering one or more sensing operations of a sensor via the one or more sensor operation activation signals includes:
   powering at least one of one or more thermal sensing operations, one or more pressure sensing operations, one or more image sensing operations, one or more audio sensing operations, or one or more motion sensing operations of a sensor via the one or more sensor operation activation signals.

18. The system of claim 16, wherein the powering one or more sensing operations of a sensor via the one or more sensor operation activation signals includes:
   powering one or more electromagnetic radiation sensing operations of a sensor via the one or more sensor operation activation signals.

19. The system of claim 1, further comprising:
   charging one or more power storage devices via the one or more sensor operation activation signals.

20. The system of claim 19, wherein the charging one or more power storage devices via the one or more sensor operation activation signals comprises:
   charging one or more batteries via the one or more sensor operation activation signals.

21. The system of claim 19, wherein the charging one or more power storage devices via the one or more sensor operation activation signals comprises:
   charging one or more capacitors via the one or more sensor operation activation signals.

22. The system of claim 19, further comprising:
   powering one or more sensing operations of a sensor via the one or more power storage devices.

23. The system of claim 1, further comprising:
   wirelessly transmitting sensor data from the sensor to the sensor monitoring device in response to the one or more sensor operation activation signals.

24. The system of claim 23, wherein the wirelessly transmitting sensor data from the sensor to the sensor monitoring device in response to the one or more sensor operation activation signals includes:
   wirelessly transmitting sensor data via a micro-electro-mechanical device of the sensor.

25. The system of claim 1, wherein the determining, based at least partially on the one or more wireless signals received from the sensor, whether a line-of-sight path between the sensor and the device is interrupted comprises:
   retrieving at least one stored sensor location from at least one sensor location database; and
   determining, based at least partially on the at least one stored sensor location, whether a line-of-sight path between the sensor and the device is interrupted.

26. The system of claim 1, wherein the receiving, from a sensor, one or more wireless signals indicative of a presence of the sensor within a portion of a region to be monitored comprises:
   scanning a region with a sensor acquisition signal;
   detecting a presence of the sensor within the region based at least partially on the sensor acquisition signal, and
   wherein the determining, based at least partially on the one or more wireless signals received from the sensor, whether a line-of-sight path between the sensor and the device is interrupted includes at least:
      determining, based on the detected presence of the sensor within the region, whether a line-of-sight path between the sensor and the device is interrupted.

27. The system of claim 1, wherein the detecting one or more relay devices disposed between the sensor and the device based at least partially on the determination whether the line-of-sight path exists comprises:
   detecting one or more electro-optical elements disposed between the sensor and the device, and
   wherein the configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices includes at least:
      configuring the directional antenna of the device for directionally transmitting the one or more sensor operation activation signals to the one or more electro-optical elements disposed between the sensor and the device.

28. A system comprising:
- means for receiving, from a sensor, one or more wireless signals indicative of a presence of the sensor within a portion of a region to be monitored;
- means for determining, based at least partially on the one or more wireless signals received from the sensor, a direction to the sensor relative to a device being configured for transmitting one or more sensor operation activation signals;
- means for determining, based at least partially on the one or more wireless signals received from the sensor, whether a line-of-sight path between the sensor and the device is interrupted;
- means for detecting one or more relay devices disposed between the sensor and the device based at least partially on the determination whether the line-of-sight path exists; and
- means for configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices.

29. A system for communicating with one or more sensors in an ad-hoc sensor network comprising:
- circuitry for receiving, from a sensor, one or more wireless signals indicative of a presence of the sensor within a portion of a region to be monitored;
- circuitry for determining, based at least partially on the one or more wireless signals received from the sensor, a direction to the sensor relative to a device being configured for transmitting one or more sensor operation activation signals;
- circuitry for determining, based at least partially on the one or more wireless signals received from the sensor, whether a line-of-sight path between the sensor and the device is interrupted;
- circuitry for detecting one or more relay devices disposed between the sensor and the device based at least partially on the determination whether the line-of-sight path exists; and
- circuitry for configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices.

30. A computer-readable medium tangibly embodying computer-readable instructions for execution of a process on a computing device, the process comprising:
- receiving, from a sensor, one or more wireless signals indicative of a presence of the sensor within a portion of a region to be monitored;
- determining, based at least partially on the one or more wireless signals received from the sensor, a direction to the sensor relative to a device being configured for transmitting one or more sensor operation activation signals;
- determining, based at least partially on the one or more wireless signals received from the sensor, whether a line-of-sight path between the sensor and the device is interrupted;
- detecting one or more relay devices disposed between the sensor and the device based at least partially on the determination whether the line-of-sight path exists; and
- configuring a directional antenna of the device for directionally transmitting the one or more sensor operation activation signals to the sensor based at least partially on the direction to the sensor relative to the device, based at least partially on whether a line-of-sight path between the sensor and the device is interrupted, and based at least partially on the detected one or more relay devices.

\* \* \* \* \*